April 21, 1931. A. I. SMITH 1,802,286
WINDSHIELD HEATER
Filed Dec. 18, 1929
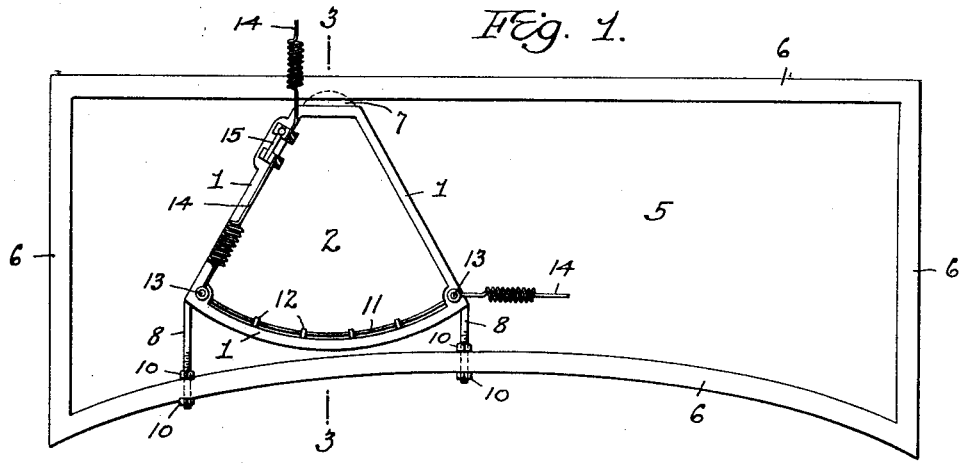
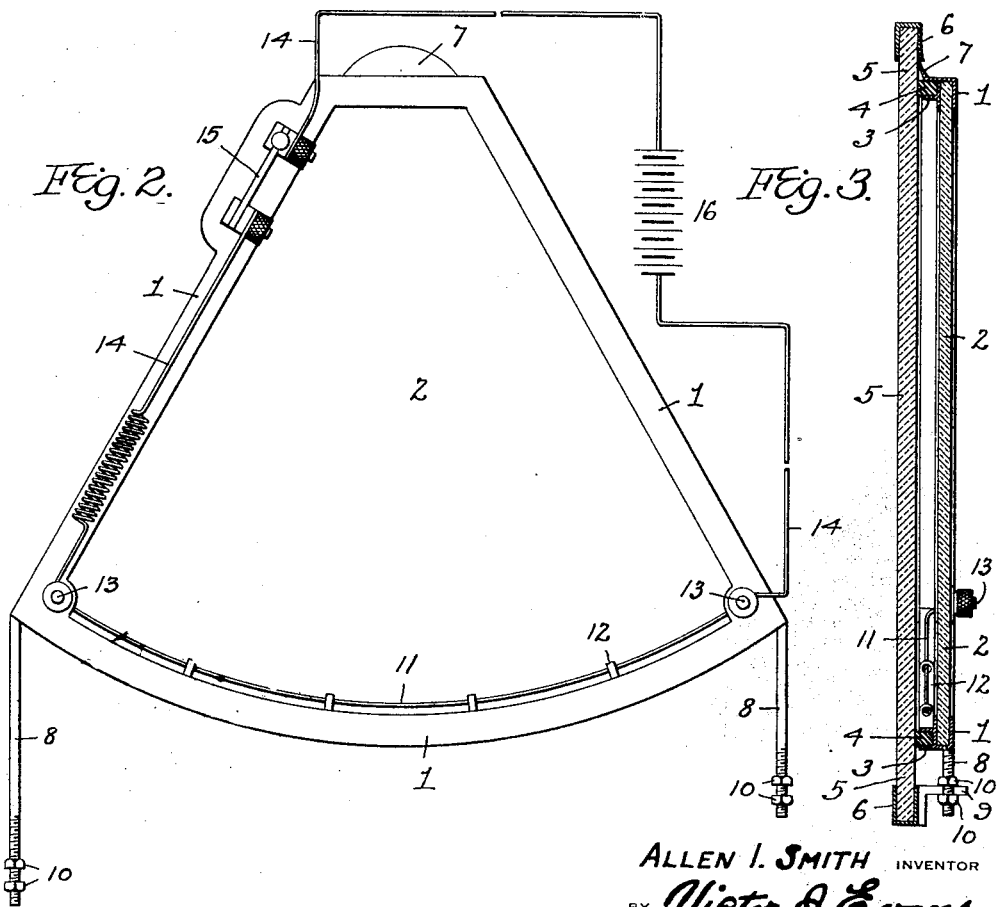
ALLEN I. SMITH INVENTOR Patented Apr. 21, 1931

1,802,286

UNITED STATES PATENT OFFICE

ALLEN I. SMITH, OF WHEELER, TEXAS

WINDSHIELD HEATER

Application filed December 18, 1929. Serial No. 415,078.

My present invention has reference to an improved device for preventing condensation on vehicle windshields and the like.

My object is to provide a device for this purpose that includes a substantially triangular frame carrying a glass face and having means whereby the same may be easily and quickly but firmly and securely arranged on the inner face of a windshield to provide a heating compartment between the windshield and the frame, the said frame having at the bottom thereof a heating element in the nature of a wire which is properly held by blocks of insulating material, and wherein a source of electric energy controlled by a suitable switch is directed to the heating element to heat the inner windshield at the portion thereof surrounded by the frame and also wherein the device is of such construction as to not interfere with the operation of the ordinary windshield wiper should the same be found necessary as when the vehicle is being driven through heavy snow storms or the like.

To the attainment of the foregoing and many other objects which will present themselves, the invention resides in the construction, combination and operative association of parts, one satisfactory embodiment of which is disclosed by the accompanying drawings.

In the drawings:

Figure 1 is a plan view of the improvement in applied position.

Figure 2 is an enlarged plan view of the improvement per se.

Figure 3 is a sectional view on the line 3—3 of Figure 1.

The frame 1 of my improvement is of triangular shape. The angle side members of the frame are disposed at such angles as to agree with the limit of the sweep of the windshield wiper which may be attached to the outer face of the windshield upon whose inner face my improvement is applied.

The frame has its outer portion of substantially U-shaped formation, the said U-shaped part providing a pocket for the edges of a triangular shaped glass pane 2 and the said pane may be of vitreous material. The inner face of the frame is also formed with a continuous substantially U-shaped projection 3 in which is seated a continuous compressible member 4 that projects through the pocket provided by the said U-shaped portion and which is brought into tight engagement with the inner face of the windshield 5. The glass of the windshield is encased in the usual cross sectional U-shaped frame 6 and the top and apex portion of the frame of my improvement is formed with a thin tongue 7 that is designed to be inserted in the top member of the frame and to be arranged against the windshield pane 5. The widened corners of the improvement are provided each with a depending rod 8, and these rods are feathered and designed to be passed through the lower member of the frame 6 when the latter is of sufficient thickness or to be passed through brackets or angle arms 9 which are secured to the said lower member of the frame 6. The rods have their outer ends threaded and have screwed thereon spaced nuts 10. One of these nuts contacts with the upper edge of the frame member or with the bracket 9 and the other with the lower edge of the frame member or with the bracket 9. By adjusting the nuts the tongue 7 can be forced into the space between the upper frame member 6 and the windshield glass therein and by this simple means it will be noted that the frame is effectively supported upon the windshield.

Trained along the arched bottom of the triangular frame of the improvement there is one or more heating wires 11. These wires are held out of contact with the glass 2 or with the glass 5 of the windshield through the medium of preferably equidistantly spaced blocks 12 of insulating material and which also may be compressible. The ends of the heating elements 11 are connected to binding posts 13 which extend through the corners of the frame 1 and to these binding posts there are connected the conductors 14 for a source of electric energy. A switch 15 controls the flow of electricity to the heating elements 11, the said switch being in the nature of a knife member and being, as disclosed by the drawings, arranged upon one of the side members of the frame. The conductors 14 may be connected to a battery 16 which is independent of the battery for the machine but preferably these members are connected directly to the source of electricity of the automobile.

With my improvement it will be noted that I have afforded a heating cylinder that is in the nature of an air-tight pocket which is positioned upon the inner face of the windshield and that the wires 11 will give out sufficient heat to prevent any condensation upon either the panes 2 or 5. The device, as previously stated, may be easily attached to any ordinary windshield construction and as readily removed therefrom. Also as previously stated, the device does not interfere with the arrangement of the ordinary windshield wiper and the construction and advantages of my improvement will, it is thought, be apparent to those skilled in the art to which such invention relates so that further detailed description will not be required.

Having described the invention, I claim:

A windshield heater comprising a triangular shaped frame of substantially U-shape in cross section to provide spaced flanges, a transparent panel carried by the frame between the flanges, cushion holding portions of substantially U-shaped in cross section formed on the frame at right angles to the flanges, a cushion element mounted in the cushion holding portion and bearing against the glass of a windshield with the apex of the triangular shaped frame disposed toward the upper run of the frame of the windshield, a tongue on the apex of the triangular shaped frame and inserted between the glass and one wall of the upper run of the windshield frame, adjustable securing means attaching the triangular shaped frame to the lower run of the windshield frame and adapted to force the tongue between said glass and windshield frame when adjusted, cushion insulators carried by the triangular shaped frame and bearing against the glass of the windshield, and an electrical heating element supported by the insulators and spaced thereby from the glass of the windshield and the panel of the frame.

In testimony whereof I affix my signature.

ALLEN I. SMITH.